United States Patent
Hoos

[11] 3,868,867
[45] Mar. 4, 1975

[54] DIFFERENTIAL HARMONIC DRIVE
[75] Inventor: Pieter F. Hoos, Greensburg, Pa.
[73] Assignee: Valve Systems International, Inc., Bala Cynwyd, Pa.
[22] Filed: Dec. 26, 1973
[21] Appl. No.: 427,634

[52] U.S. Cl. ................................................. 74/773
[51] Int. Cl. ......................... F16h 3/44, F16h 57/10
[58] Field of Search ....................... 74/773, 774, 753

[56] References Cited
UNITED STATES PATENTS
1,462,951   7/1923   Welffens ............................ 74/773 X
2,947,202   8/1960   Montalva-Calderon .............. 74/773

*Primary Examiner*—Leonard H. Gerin
*Attorney, Agent, or Firm*—Melvin R. Stidham, Esq.

[57] ABSTRACT

A Differential Harmonic Drive which includes three or more coaxial wheels. A wave generator wheel carries rotatable planet shafts to orbit them around the other coaxial wheels, a stationary or reference wheel, and one or more rotatable output wheels. Driving engagements between the stationary wheel and its orbiting planet wheels impart rotation to the planet shafts, so that driving planet wheels on the same shafts rotate the output wheels as they orbit around them. The stepped-up drive ratio imparted by the stationary wheel is different from the steppeddown ratio between the output wheel and its planet wheels, and the differential governs the overall ratio of the system. For a variation in overall drive ratio, either of two or more output wheels may be activated selectively or the output wheel and its associated planet wheel may constitute a variable ratio drive system.

8 Claims, 7 Drawing Figures

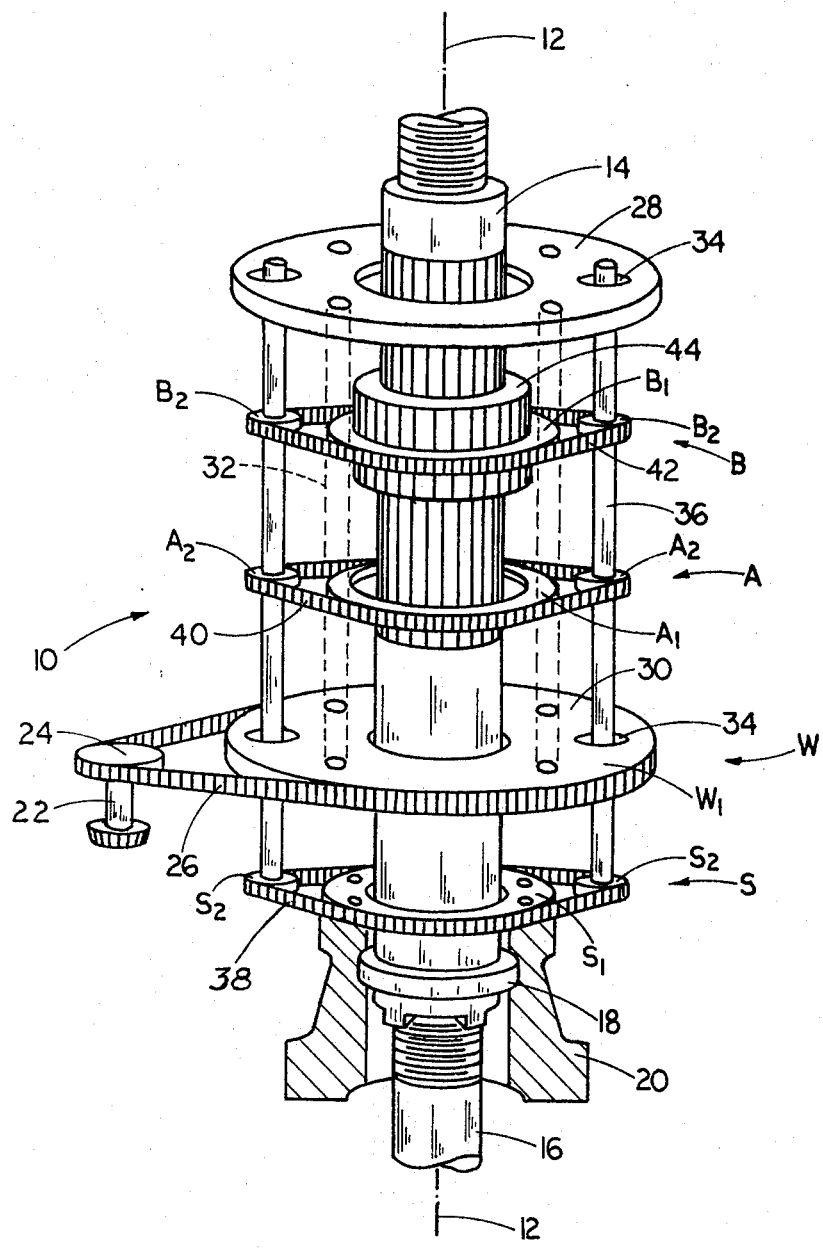
FIG.-1-

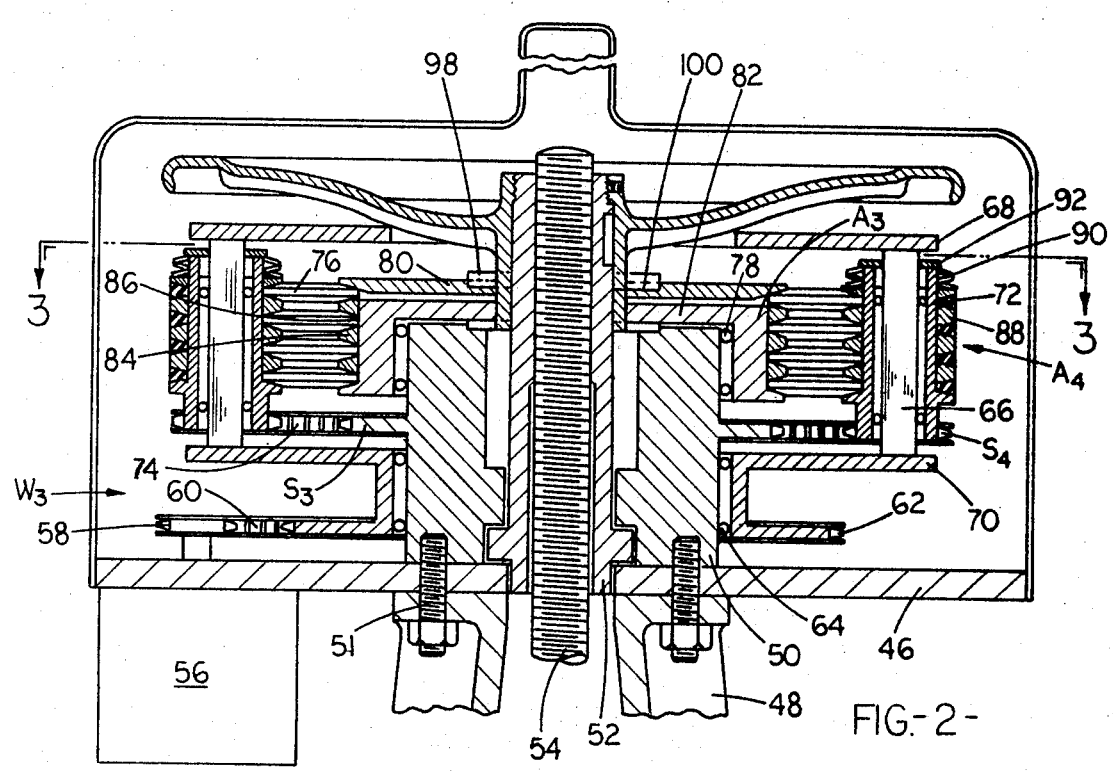
FIG.-2-
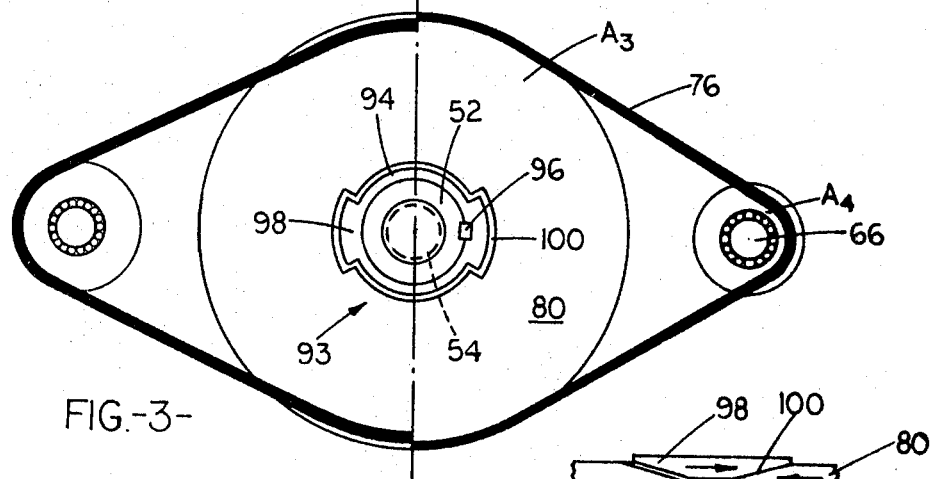
FIG.-3-
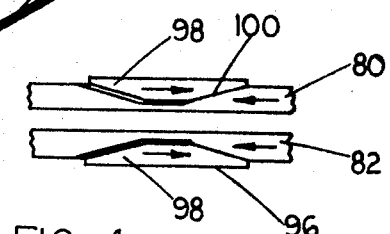
FIG.-4-

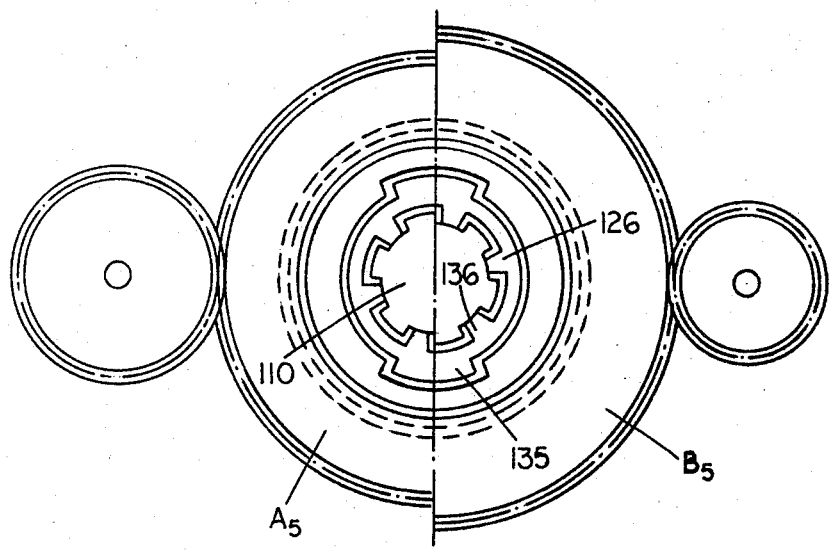
FIG.-6-
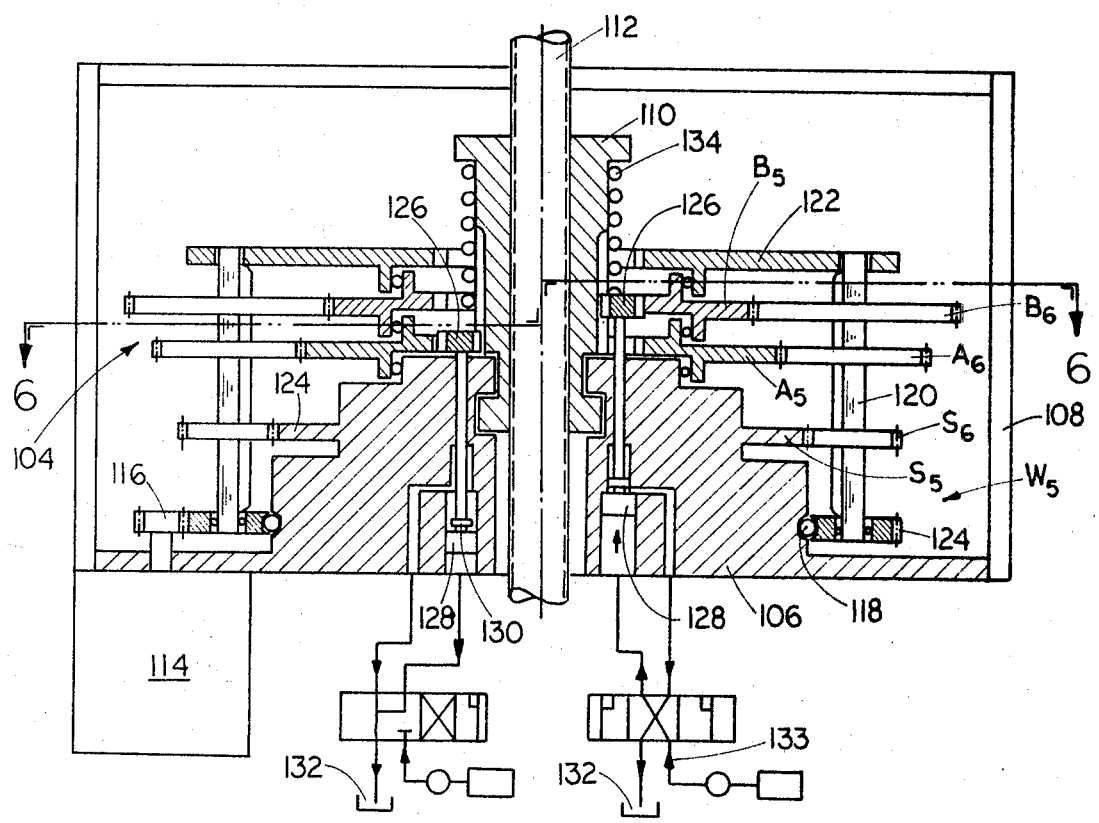
FIG.-5-

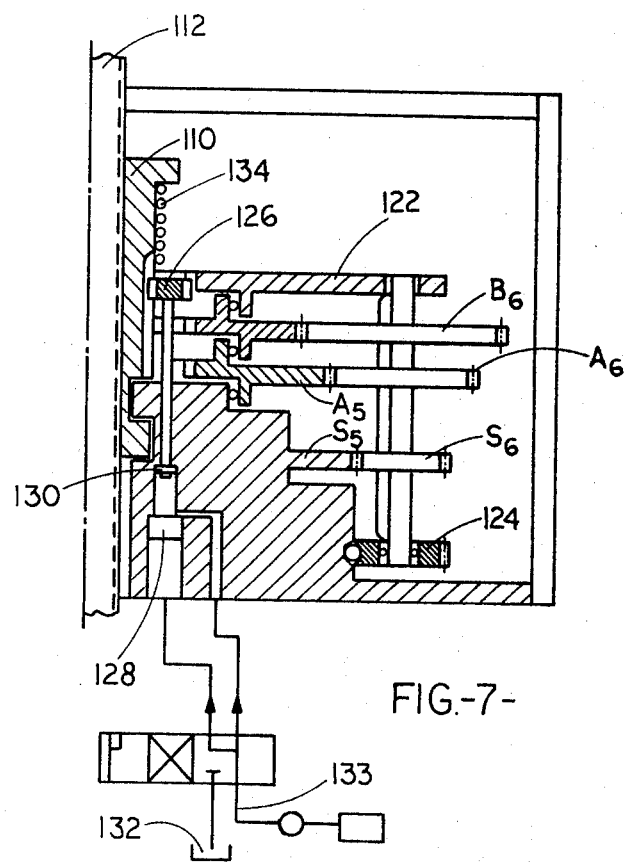
FIG.-7-

DIFFERENTIAL HARMONIC DRIVE

BACKGROUND OF THE INVENTION

Industrial and pipeline valves such as plug valves, ball valves, globe valves, and gate valves require high operating torques, particularly when they are designed to operate under high system pressure conditions. To create high operating torques from low torque electric, or other type motors, the standard procedure is to employ large gear trains of efficient spur gears or to use one set of the more expensive, and relatively inefficient worm and worm gear drives. Both systems require gear boxes of very sturdy design with a high degree of machining accuracy for gear alignment and gear matching.

When the actuators are mounted on gate valves in pipelines, they are exposed to seismic oscillations or other types of vibrations. It is, therefore, desirable that an actuator be of light weight and be adapted for mounting as close to the gate valve center of gravity as possible, in order to reduce heavy structural mounting requirements. It is also desirable to have an actuator of high efficiency so that the actuator can perform its operations with the smallest possible motor, reducing the motor weight hanging on to it. In many instances, it is desirable that a large gate valve can be closed at a fairly high rate of speed, though it remains desirable, or even necessary, to be able to create high torques to perform final seating in its full closed condition.

OBJECTS OF THE INVENTION

It is an object of this invention to provide a valve actuator of light weight construction, of high efficiency, which can produce high torques at low speeds and low torques at high speeds.

It is a further object of this invention to provide a valve actuator which is capable of producing a high mechanical advantage at high efficiency to overcome high torque when the valve operator requires such high torque.

It is a further object of this invention to provide a valve actuator which is capable of rapid operation when torque requirements are not high.

It is a further object of this invention to provide a valve actuator which supplies pure torque to the valve stem, thus eliminating the requirements for high load radial bearings, consequently eliminating the need for a heavy enclosure.

It is a further object of this invention to provide a valve actuator which may be selectively shifted into a high torque low speed condition or a low torque high speed condition.

It is a further object of this invention to provide a valve actuator having means for automatically increasing the overall drive ratio in response to stem torque requirements.

Other objects and advantages of this invention will become apparent from the description to follow when read in conjunction with the accompanying drawings.

BRIEF SUMMARY OF THE INVENTION

In carrying out this invention, there are provided three or more coaxial wheels. The input wheel carrying a wave generator, a stationary wheel, and the output wheels, or a single output wheel with an outer variable diameter. The output wheel or wheels are mounted to drive the output member, as for example, the stem nut on a valve. Rotatably carried on the input wheel on diametrically opposite sides of the axis of rotation is a pair of planet wheel shafts, which are orbited about the stationary wheel and the output wheels. All planet wheels on a planet wheel shaft are in fixed rotary relation to each other. A driving engagement exists between the stationary wheel and the corresponding wheels on the planet wheel shaft and also between the output wheel and its corresponding wheels on the planet wheel shaft. When the input wheel is driven, the planetary shafts orbit around the stationary wheel and the output wheels. The driving engagement between stationary wheel and the corresponding planet wheels cause the planet wheel shafts to rotate, thus rotating the driving planet wheels which, drive the output wheels. A differential between the stepped-up drive ratio of the stationary wheel and its planets and the stepped-down ratio of the output wheel and its planets, produces an overall drive ratio, which may be varied over a wide range with relatively small variation in the drive ratio differential. In one embodiment there are two output wheels having different drive ratios with respect to the stationary wheels, either of which may selectively be connected through a clutch member to an output member, as for example, a valve stem nut; or the clutch may connect the input wheel directly to the output member for a direct or one to one drive ratio.

In another embodiment, the output is through a variable ratio belt sheave and planet sheave combination, and this embodiment may include a torque sensing device, which affects the diameter of the output sheave and planet sheave in response to torque variations imposed on the output member.

BRIEF DESCRIPTION OF THE DRAWINGS

In the drawings:

FIG. 1 is a schematic isometric view of a multi-speed differential harmonic drive embodying features of this invention;

FIG. 2 is a vertical cross-section of another harmonic drive embodiment;

FIG. 3 is a top view taken along Line 3—3 of FIG. 2;

FIG. 4 is a partial view of a torque sensing device constituting a feature of the embodiment of FIG. 2;

FIG. 5 is a vertical section view of a third embodiment of this invention showing two conditions of operation;

FIG. 6 is a view taken along Line 6-6 of FIG. 5; and

FIG. 7 is a partial section view of the embodiment of FIG. 5 showing a third condition of operation.

DESCRIPTION OF PREFERRED EMBODIMENTS

The Embodiment of FIG. 1

Referring now to FIG. 1 with greater particularity, there is shown a multi-speed differential harmonic drive arrangement 10 comprising essentially four drive units with coaxial wheels, a wave generator W including an input wheel $W_1$, a reference drive S with stationary wheel $S_1$, a high reduction-low-speed output drive A with output wheel $A_1$, and a low reduction-high speed output drive B with output wheel $B_1$. The wave generator drive wheel $W_1$ and the wheels $S_1$, $A_1$, and $B_1$ of the respective drives S, A, and B are all mounted on the axis 12 of an output member 14, such as a sleeve or stem nut, which is threaded onto a valve stem 16 and rotatably carried at 18 in a valve yoke or bonnet 20.

The wave generator wheel $W_1$ may be motor or hand driven through a drive system which consists of an input shaft 22 on which is carried a sprocket 24, driving a chain or belt 26. The chain 26 is engaged on the input wheel $W_1$ of the wave generator whereby rotation of the input sprocket 24 will produce rotation of the wave generator wheel $W_1$ at a reduced rate which is constant at any selected drive ratio.

The wave generator W consists of a top plate 28, a bottom plate 30, some means to interconnect these plates, such as standoff bolts 32, and two planet wheel shafts 36. On the bottom plate of the wave generator 30, is formed the input wheel $W_1$ to drive the wave generator. The planet wheel shafts 36 are rotatably mounted between the bottom and top plates 30 and 28 in suitable bearings 34. The planet shafts 36 are mounted diametrically opposite to each other in the wave generator W, to provide pure torque, which will minimize bearing load and thus reduce bearing design requirements. On the shafts 36 are mounted sprocket wheels $S_2$, $A_2$, in a fixed relation to each other. Sprocket wheels $S_2$, $A_2$, and $B_2$, are in a driving relation with concentric wheels $S_1$, $A_1$, and $B_1$, through flexible members 38, 40, and 42, respectively. These flexible members can be chains or belts.

As the wave generator W rotates, the sprockets $S_2$ orbit around the stationary wheel $S_1$ in engagement with the chain or belt 38, and hence, the shafts 36 are caused to rotate at an increased, or stepped-up, rate in accordance with the drive ratio between the stationary sprocket $S_1$ and its planet $S_2$, which ratio may be expressed as $S_1/S_2$.

Since the planet wheels $A_2$ and $B_2$ are fixed onto the shaft 36, they rotate at the same rate as the planet wheel $S_2$ as they, too, orbit their output wheels $A_1$ and $B_1$. The drive ratio of each of the output drives A and B, can be expressed as a ratio in decreasing, or stepped-down rate, of $A_2/A_1$ and $B_2/B_1$ respectively.

Rotation of the wave generator W will orbit the planet shafts 36 about the coaxial wheels $S_1$, $A_1$, and $B_1$. Rotatively mounted on the planet shaft 36 and in fixed relation to each other are mounted planet sprockets $S_2$, $A_2$ and $B_2$. These sprockets are in engagement with the respective wheels $S_1$, $A_1$ and $B_1$ thru flexible members 38, 40 and 42. Rotation of the wave generator W will rotate the planet wheel $S_2$ with respect to the stationary wheel $S_1$ in accordance with a stepped-up ratio $S_1/S_2$ and, with it, the planet wheels $A_2$ and $B_2$ which are in fixed relation to $S_2$.

Thus, all the planet wheels $S_2$ $A_2$ and $B_2$ rotate with respect to the stationary wheel $S_1$ at the same stepped-up ratio of $S_1/S_2$. The output wheels, on the other hand, are in a stepped-down relationship to the planet wheels $A_2$ and $B_2$ at a ratio of $A_2/A_1$ and $B_2/B_1$. Therefore, the overall relations of the output wheels to the stationary can be expressed by the ratios $(S_1/S_2 \times A_2/A_1) : 1$ and $(S_1/S_2 \times B_2/B_1) : 1$ These equations express the relationship between stationary wheel $S_1$ and the output wheel, $A_1$ or $B_1$ and to construe this as meaning that the output wheel $A_1$ will rotate $S_1/S_2 \times A_2/A_1$ revolution for each single revolution of the stationary wheel is to assume that the wave generator wheel $W_1$ is stationary. Since, in fact, the stationary wheel $S_1$ is not rotating and the input is actually derived from the rotating wave generator we have to turn the whole system $(S_1/S_2 \times A_2/A_1)$ back one revolution with respect to the wave generator W to get the stationary wheel $S_1$ back in its original position and to get a condition which represents one revolution of the wave generator.

The relationship between $W$ and $A_1$ is such that one revolution of the wave generator wheel $W_1$ produces $1 - (S_1/S_2 \times A_2/A_1)$ revolution of $A_1$. Hence, the overall drive ratio can be expressed as $R_H = 1/1 - (S_1/S_2 \times A_2/A_1)$ If the ratio $S_1/S_2$ were stated as $R_S$, the ratio $A_1/A_2$ as $R_A$ and the ratio $B_1/B_2$ as $R_B$, then the equation becomes $R_H = 1/(1 - R_S/R_A)$ or $R_H = 1/(1 - R_S/R_B)$ It will be apparent from the above equation that, as the output ratio $R_A$ (or $R_B$) approaches the stationary reference drive ratio $R_S$, the overall ratio becomes infinite and the output shaft will stand still. It will also be apparent that when the output ratio $R_A$ is the larger of the two, the result of $1 - (R_S/R_A)$ is positive and the rotation of the output wheel will be in the same direction as that of the wave generator, i.e., positive. Similarly, if the output ratio is smaller, rotation of the output wheel will be negative.

It can be demonstrated that, with a small variation of one of the two differential ratios, a very substantial variation in the overall ratio can be realized. To illustrate this, assume that $R_S = 6$ and $R_A = 5$:

$R_H = 1/(1 - 6/5) = 1/(1 - 1.2) = -1/.2 = -5/1$

Then, by increasing $R_A$ (or $R_B$) from 5 to 5.8:

$R_H = 1/(1 - 6/5.8) = 1/(1 - 1.0344) = -29/1$ and by further increasing $R_A$ (or $R_B$) to 5.95:

$R_H = 1/(1 - 6/5.95) = 1/(1 - 1.0084) = -119/1$

With the multi-speed differential harmonic drive arrangement just described, there may be provided a lock ring 44 splined onto the output sleeve 14 and slidable therealong to engage selectively with output wheels $A_1$, $B_1$, or with the top deck 28 of the wave generator W. Hence, the sliding lock ring 44 may be moved to engage with the high reduction-low speed output wheel $A_1$, the low reduction-high speed output wheel $B_1$, or the wave generator unit W itself to produce a direct one-to-one drive.

Hence, drive ratios could be selected to produce a desired range of high, low, and reverse speeds which, with the direct drive provided by coupling with the top deck of the wave generator, provides a satisfactory range of drive ratios. For example, with the ratio of the stationary drive $R_S = 6$, the low speed output could be set so that $R_A = 5.95$ to provide the 119 to 1 ratio described above; the ratio of the high speed output could be set so that $R_B = 5$ whereby a 5 to 1 ratio will be provided as above described and, of course, coupling with the top plate 28 provides a direct one-to-one drive.

The Embodiment of FIGS. 2, 3, and 4

Referring now to FIGS. 2, 3, and 4, there is shown another embodiment of the multi-speed differential harmonic drive, again comprising a wave generator $W_3$, a stationary wheel $S_3$, and an output wheel $A_3$. However, in this embodiment the output wheel is in the form of a variable ratio sheave, to be described hereinafter, whereby a broad range in overall drive ratios is achieved through a variation over a narrow range of output drive ratios.

As shown in FIG. 3, a housing 46 for the drive may be mounted directly on the yoke 48 of a conventional valve, such as a gate valve (not shown) with a boss 50 bolted thereto at 51 carrying the stationary sprocket wheel $S_3$ and rotatably receiving a stem nut 52. The stem nut in turn threadedly receives the stem 54 of the valve whereby rotation of the stem nut 52 raises or lowers the valve stem 54.

Mounted on the drive housing 46 by any conventional means (not shown) is a motor 56 on the shaft of which is mounted the input sprocket 58, which through the medium of a drive chain 60 rotates a sprocket wheel 62 on the input or wave generator $W_3$. The wave generator $W_3$ is rotatably carried on the stationary boss 50 as by means of suitable bearings 64. Rotatably carried on the wave generator $W_3$, on spindles 66 extending between top and bottom plates thereof 68 and 70 are splined planet wheel shafts 72 to which are fixed planet sprocket wheels $S_4$, which are driven off the stationary sprocket $S_3$ through the chain 74. On the splined shafts 72 are mounted sheave discs comprising the variable ratio planet wheels $A_4$. The planet wheels $A_4$ drive the output wheel $A_3$ through the medium of a plurality of V-belts 76. As in the embodiment of FIG. 1, rotation of the wave generator $W_3$ to orbit the planet shafts 72 around the stationary sprocket $S_3$ and its planet wheel $S_4$. Also as described in conjunction with the FIG. 1 embodiment, the driving planet wheel $A_4$ will drive the output wheel $A_3$ relative to it in accordance with the ratio between them whereby the overall ratio will be in accordance with the equation:

$$R_H = 1/(1 - R_S/R_A)$$

The output wheel $A_3$, which is rotatably carried on bearings 78 on the central stationary boss 50, is of the variable ratio type. As shown, it includes top and bottom plates 80 and 82 with a plurality of tapered rings 84 slidably and non-rotatably carried on the periphery 86 of the bottom plate, whereby the effective diameters of output wheel $A_3$ for the V-belts 76 can be varied in accordance with the axial spacing of the rings. Similar rings 88 carried on the planet wheels $A_4$ are slidable on the planet wheel shafts 72 to compensate for differences in the effective diameter of the output wheel $A_3$. Axial displacement of the tapered rings 84 and 88 is opposed by Belleville Springs 90, which are carried on the planet wheel shaft 72 and adjustable at 92. Hence, as shown in FIG. 3, an increase in the effective diameter of the output wheel $A_3$ will pull the V-belts tighter to spread the rings 88 to reduce the effective diameter thereof.

As shown more clearly in FIGS. 3 and 4, the output wheel $A_3$ is mounted on the stem nut 52 by means of a torque sensing device 93 which increases the drive ratio in accordance with an increase in torque. The torque sensing device comprises a ring 94 which is keyed at 96 to the stem nut 52 and has a pair of diametrically opposed radial wedge extensions 98, which engage in complementary wedging depressions 100 formed in the upper and lower plates 80 and 82 of the output wheel $A_3$. Hence, the rotation of the output wheel $A_3$ is transmitted to the stem nut 52 through the wedging surfaces 98 and 100 on the wheel $A_3$ and the torque sensor 94, respectively. It is also apparent that the greater the torque, the greater amount of wedging engagement will be required to drive the torque sensor 94, causing the cam surfaces on the wheels 80 and 82 to slide between the cam surfaces on the torque sensors 94. Squeezing the wheel segments 80 and 82 together increases the effective diameter of the output wheel $A_3$ and increases the drive ratio to the output wheel $A_3$ from its planet wheel $A_4$. As previously described, a relatively small variation in this output drive ratio can produce a very substantial overall drive ratio.

The Embodiment of FIGS. 5 to 8

Referring now more particularly to FIGS. 5 to 8, there is shown how the multi-speed differential harmonic drive principle of this invention may be applied to a gear reduction unit 104. There, a stationary block 106, which forms a part of a housing 108, rotatably carries an output member, such as the stem nut 110 which threadedly receives the rising stem 112 of a conventional gate valve or the like (not shown).

A motor 114 carried on the housing 108, drives the input pinion 116 which in turn rotates the wave generator $W_5$. The wave generator is rotatably carried around on bearings 118 on the stationary block 106 to orbit the planet wheel shafts 120 about the stationary block 106 and, hence, the stationary gear $S_5$ carried thereon.

The planet gear shaft 120 is rotatably carried in upper and lower decks 122 and 124 of the wave generator $W_5$, whereby the orbital movement of the planetary gear shaft 120 will drive the shaft at a rate of rotation dependent upon the ratio between the stationary gear $S_5$ and its planetary gear $S_6$. The drive planetary gears $A_6$ and $B_6$ will also rotate at this same rate to drive the high reduction output wheels and low reduction output wheels $A_5$ and $B_5$, depending upon which is activated.

In either event, the output will be in accordance with the equation:

$$R_H = 1/(1 - R_S/R_A) \text{ or } 1/(1 - R_S/R_B)$$

previously derived. In accordance with the above equation, using a reference drive ratio $R_S = 6:1$, one could select, for example, a high reduction drive providing a ratio of $R_A = 5.94$ to achieve an overall ratio, $R_H$, of 100 to 1 and a low reduction drive of $R_B = 5.45$ to achieve an overall ratio, $R_H$, of 10 to 1.

As shown in FIG. 5, the sliding lock ring 126 which determines the overall drive ratio to be selected may also be engaged with the upper deck 122 of the wave generator $W_5$, by-passing the harmonic drive completely and providing a direct one-to-one drive.

The sliding lock ring can be actuated by a hydraulic shifting means including pistons 128 and 130 in tandem, slidable in cylinders. In the left hand side of FIG. 5, both cylinders are unpressurized and open to the reservoir 132 whereby the spring 134 acting against the top of the lock ring 126 moves the assembly to its lowermost position shown, engaging the lock ring 126 with the high reduction output wheel $A_5$ at 135. The lock ring, in turn, is slidably carried on the stem nut 110 by loose engagement of splines 136 thereon in complementary slots in the stem nut 110. Substantial clearances in both angular directions provide a limited amount of free rotation of the output wheel $A_5$ or $B_5$ prior to engagement with the lock ring 126 and similar free rotation of the lock ring 126 prior to driving engagement with the stem nut 110 in order to provide an impact force for initial valve operation.

In the right hand section of FIG. 5, the large cylinder is pressurized at 133 while the small cylinder is unpressurized and open to the reservoir 132. Hence, the large piston 128 is moved upward to the extent of its stroke, carrying the small piston with it. This provides axial movement of the lock ring 126 sufficient to raise it to its intermediate position shown wherein it is in engagement with the low reduction output wheel $B_5$ to provide the intermediate reduction drive.

Finally, as shown in FIG. 7, both pistons 128 and 130 may be pressurized to drive the large piston 128 through its stroke and, thereafter, the small piston 130 through its stroke to carry the lock ring 126 to its uppermost position in engagement with the top deck 122 of the wave generator $W_5$ providing the direct, one-to-one drive.

While this invention has been described in conjunction with the preferred embodiments thereof, it is obvious that modifications and changes therein may be made by those skilled in the art without departing from the spirit and scope of this invention.

What is claimed as invention is:

1. A differential harmonic drive comprising:
   a rotary input member rotatable about an axis;
   a shaft on said input member displaced from and parallel to said axis;
   first and second planetary wheels rotatable together on said shaft;
   first and second complementary wheels on said axis;
   first and second engaging drive means between said first planetary and complementary wheels and between said second planetary and complementary wheels, respectively; and
   means preventing rotation of said first complementary wheel;
   said second complementary wheel being adapted to deliver a rotary output;
   the rotary drive ratio between said first planetary and complementary wheels being different than that between said second planetary and complementary wheels.

2. The differential harmonic drive defined by claim 1 wherein:
   at least one of said first and second drive means comprises a chain and sprocket connection.

3. The differential harmonic drive defined by claim 1 wherein;
   said secondary planetary wheel and said second complementary wheel are variable ratio belt drives.

4. The differential drive defined by claim 1 including:
   means for varying the drive ratio between said second planetary wheel and said second complementary wheel in response to variation in torque on said second complementary wheel.

5. The differential harmonic drive defined by claim 1 wherein:
   said rotary drive ratios are nearly equal.

6. The differential harmonic drive defined by claim 1 including:
   an output member rotatable on said axis;
   a third planetary wheel rotatable on said shaft with said first and second planetary wheel;
   a third complementary wheel on said axis;
   third engaging drive means between said third planetary and complementary wheels;
   the rotary drive ratio between said third planetary and complementary wheels being different than that between said second planetary and complementary wheels; and
   selectively operable means for coupling said output member to one of said second and third complementary wheels.

7. The differential harmonic drive defined by claim 1 including:
   an output member rotatable on said axis; and
   selectively operable means for coupling said output member to one of said input member and second complementary wheels.

8. The differential harmonic drive defined by claim 1 including:
   a second shaft on said input member displaced from and parallel to said axis;
   a pair of planetary wheels on said second shaft;
   engaging drive means between said planetary wheels and said complementary wheels; and
   said shafts being spaced equally from said axis on a common pitch diameter.

* * * * *